US012606197B2

(12) United States Patent
Bárdos et al.

(10) Patent No.: US 12,606,197 B2
(45) Date of Patent: Apr. 21, 2026

(54) METHOD AND SYSTEM FOR AN AUTONOMOUS MOTION CONTROL AND MOTION PLANNING OF A VEHICLE

(71) Applicant: Budapesti Müszaki és Gazdaságtudományi Egyetem, Budapest (HU)

(72) Inventors: Ádám Bárdos, Martonvásár (HU); Zsolt Szalay, Budapest (HU)

(73) Assignee: Budapesti Muszaki és Gazdaságtudományi Egyetem, Budapest (HU)

( * ) Notice: Subject to any disclaimer, the term of this patent is extended or adjusted under 35 U.S.C. 154(b) by 367 days.

(21) Appl. No.: 18/269,868

(22) PCT Filed: Dec. 6, 2021

(86) PCT No.: PCT/HU2021/050067
§ 371 (c)(1),
(2) Date: Jun. 27, 2023

(87) PCT Pub. No.: WO2022/144559
PCT Pub. Date: Jul. 7, 2022

(65) Prior Publication Data
US 2024/0067209 A1 Feb. 29, 2024

(30) Foreign Application Priority Data

Dec. 30, 2020 (HU) ..................................... 2000452

(51) Int. Cl.
B60W 60/00 (2020.01)
B60W 50/02 (2012.01)

(52) U.S. Cl.
CPC ...... B60W 60/001 (2020.02); B60W 50/0205 (2013.01); B60W 2420/403 (2013.01);
(Continued)

(58) Field of Classification Search
CPC ........... B60W 60/001; B60W 50/0205; B60W 2420/403; B60W 2420/408;
(Continued)

(56) References Cited

U.S. PATENT DOCUMENTS

| | | | |
|---|---|---|---|
| 10,151,598 B2 * | 12/2018 | Jurk ........................ | G01C 21/20 |
| 2018/0356819 A1 * | 12/2018 | Mahabadi ............. | B60W 30/00 |
| 2019/0071078 A1 | 3/2019 | Kallmeyer et al. | |
| 2019/0263399 A1 * | 8/2019 | He ................... | B60W 60/0015 |
| 2020/0001921 A1 * | 1/2020 | Balesteros-Tolosana ................... B60W 40/072 | |

(Continued)

OTHER PUBLICATIONS

European Patent Office, International Search Report in PCT Application No. PCT/HU2021/050067, mailed on Mar. 28, 2022 (4 pgs.) and Written Opinion Of The international Searching Authority (5 pgs.).

(Continued)

*Primary Examiner* — Christopher George Fees
(74) *Attorney, Agent, or Firm* — Wood Herron & Evans LLP

(57) ABSTRACT

A method for autonomous motion control and planning of a vehicle defined as a hybrid system having hybrid modes is provided. The method comprises the steps of calculating a set of feasible vehicle states for each hybrid mode, calculating a set of reachable vehicle states, constructing a vehicle trajectory, and controlling at least one vehicle actuator to drive the vehicle to each of the consecutive feasible vehicle states of the vehicle trajectory.

23 Claims, 7 Drawing Sheets

(52) U.S. Cl.
CPC ... *B60W 2420/408* (2024.01); *B60W 2510/18* (2013.01); *B60W 2510/20* (2013.01); *B60W 2510/22* (2013.01); *B60W 2520/10* (2013.01); *B60W 2520/12* (2013.01); *B60W 2520/14* (2013.01); *B60W 2520/28* (2013.01); *B60W 2556/40* (2020.02)

(58) Field of Classification Search
CPC ......... B60W 2510/18; B60W 2510/20; B60W 2510/22; B60W 2520/10; B60W 2520/12; B60W 2520/14; B60W 2520/28; B60W 2556/40; B60W 2050/0033; B60W 2720/10; B60W 2720/12; B60W 60/0011; B60W 50/029; B60W 2050/0016; B60W 2720/14; B60W 30/02

See application file for complete search history.

(56) References Cited

U.S. PATENT DOCUMENTS

| | | | |
|---|---|---|---|
| 2020/0216085 A1* | 7/2020 | Bobier-Tiu | ........... B60W 40/08 |
| 2022/0055625 A1* | 2/2022 | Goh | ...................... B60W 50/14 |
| 2022/0097690 A1* | 3/2022 | Dede | ................... B60W 30/143 |
| 2022/0156576 A1* | 5/2022 | Rasouli | .................. G06V 10/25 |
| 2022/0169256 A1* | 6/2022 | Beal | .................... B60W 40/068 |
| 2022/0219498 A1* | 7/2022 | Agarwal | ............. B60C 23/0479 |

OTHER PUBLICATIONS

Bardos Adam et al: "Implementation and experimental evaluation of a MIMO drifting controller on a test vehicle," 2020 IEEE Intelligent Vehicles Symposuium (IV), IEEE, Oct. 19, 2020.

* cited by examiner

METHOD AND SYSTEM FOR AN AUTONOMOUS MOTION CONTROL AND MOTION PLANNING OF A VEHICLE

This application claims priority, under Section 371, and/or as a continuation under Section 120, to PCT Application No. PCT/HU2021/050067 filed on Dec. 6, 2021, which claims priority to Hungary Application No. P2000452 filed on Dec. 30, 2020, each of which is expressly incorporated by reference herein, in its entirety.

TECHNICAL HELD

The invention relates to a method and system for an autonomous motion control and motion planning of a vehicle.

BACKGROUND ART

US 2020/0216085 A1 discloses systems and methods for partially controlling a vehicle, wherein a current vehicle state, operational constraints and environmental constraints are determined based on operational information and/or contextual information originating from sensor signals. Based on the current vehicle state a future vehicle state is determined considering the operational and environmental constraints. In order to avoid an accident, the vehicle can be controlled to correct the drivers input and to perform an evasive manoeuvre. The safe and stable vehicle states are determined, and the unstable regions of the phase space of vehicle, defined by the sideslip and the yaw-rate, are to be avoided in the course of controlling the vehicle. The safety boundaries can be set individually, e.g., for a very skilled driver even drifting of the vehicle may be allowed.

U.S. Pat. No. 10,725,470 B2 discloses autonomous vehicle driving systems and methods for critical conditions. The method includes receiving a vehicle state data and an environment data, from which the method calculates an optimal path for the vehicle. The method generates a feasible trajectory for the critical condition that maintains the vehicle within a safe zone boundary.

GB 2570887 A discloses a system and method for autonomously driving a vehicle, including a calculation of reachable vehicles states and a calculation of allowable positions based on features of a nearby road segment. The allowable positions are determined by using an artificial potential field, and a feasible trajectory is generated by a Model Predicted Control (MPC).

US 2017/0168485 A1 discloses a system and method for controlling autonomous vehicles. The method determines iteratively a motion of the vehicle from an initial location and a target location. A location is determined iteratively between the initial location and the target location that satisfies spatial constraints, and state transitions are also determined as the vehicle moves from a location determined in a previous iteration to a neighbouring location. A graph of state transitions is updated for each iteration, and the motion of the vehicle is determined as a sequence of state transitions connecting the initial location with the target location and the vehicle is controlled according to the determined motion.

A major disadvantage of vehicle dynamics control systems and methods known in the art that these usually restrict vehicle states to stay below the stability limits. The reason for this restriction is that a typical human driver cannot stabilize the motion of the vehicle beyond these limits, e.g., an average driver cannot stabilize a drifting car. However, such a restriction of vehicle states decreases the manoeuvrability of the vehicle, which would be disadvantageous, e.g., in the course of an evasive safety manoeuvre or in motorsport applications.

In view of the known approaches, there is a need for a method by the help of which a more flexible and less restricted autonomous motion control of a vehicle can be achieved.

DESCRIPTION OF THE INVENTION

The primary object of the invention is to provide a method and a system for an autonomous motion control and motion planning of a vehicle, which is free of the disadvantages of prior art approaches to the greatest possible extent.

The object of the invention is to provide a method which allows for a fully autonomous motion control and motion planning of a vehicle that ensures the controllability of the vehicle in a safe manner without unnecessary safety restrictions.

The further object of the invention is to provide a system which allows for a fully autonomous motion control and motion planning of a vehicle.

The objects of the invention can be achieved by the method according to claim 1. The objects of the invention can be further achieved by the system according to claim 18. Preferred embodiments of the invention are defined in the dependent claims.

The main advantage of the method according to the invention compared to prior art approaches comes from the fact that it does not restrict the planning of a vehicle trajectory and the motion of a vehicle by prescribing that the vehicle has to be in a stable state in every time instance during the course of motion.

It has been recognized, that a vehicle can be described as a hybrid dynamical system having hybrid modes corresponding to, e.g., a continuous and a discrete dynamic behaviour of the vehicle, see for example chapter 1.8 of the book of Michael J. Grimble, Pawel Majecki: Nonlinear Industrial Control Systems (2020, Springer-Verlag London, DOI: 10.1007/978-1-4471-7457-8, pp. 42-50).

Prior art approaches typically do not allow the vehicle to enter or to get close to an unstable vehicle dynamics state, because the behaviour of the vehicle drastically changes there. For example, such a case occurs when at least one of the tires becomes saturated and the vehicle starts drifting. As drifting starts, the behaviour of the vehicle changes and different ways are needed to keep the vehicle under control. For example, when a vehicle starts drifting because one of its wheels gets saturated, then the turning of the steering wheel does not turn the vehicle in the corresponding direction any more, but the vehicle can be stabilised and controlled by turning the steering wheel into an opposite direction. A sudden unavailability of one of the vehicle actuators can lead to a similar effect, i.e., a sudden change in the controllability of the vehicle. For example, an understeered vehicle, wherein the front wheels are saturated, behaves similar to a vehicle having no steering means for the front wheels, i.e., wherein the front wheels cannot be steered.

The above situations cannot always be handled by a human driver, especially by an inexperienced driver, thus in order to avoid accidents, prior art solutions typically constrain the motion of the vehicle to remain in vehicle states wherein none of the tires are saturated. However, such limitation also decreases the flexibility of the motion control, and neglects many otherwise possible trajectories and vehicle states that could be used to avoid accidents.

The control method and system according to the invention does not limit the control of the vehicle within the usual stability boundaries of the vehicle, but the vehicle is allowed to enter any of the hybrid modes including hybrid modes wherein e.g. one of the tires is saturated. This way the vehicle is controlled in a way that allows exploring a larger part of the phase-space of possible vehicle states. Furthermore, the vehicle might be intentionally driven to selected hybrid modes, for example, with one or more saturated tires, i.e., to hybrid modes that would be considered unstable and unallowed by other control algorithms. Accordingly, a vehicle trajectory can be planned, wherein the vehicle can be in different hybrid modes along the vehicle trajectory instead of being in the same hybrid mode throughout the vehicle trajectory.

It has further been recognized, that equilibrium vehicle states (wherein the time derivatives of the equations of motion are zero) can be calculated even for hybrid modes, and that these equilibrium vehicle states can be used for constructing a trajectory. The trajectory preferably comprises a series of equilibrium vehicle states, and for a safe control of the motion of the vehicle, it is enough to ensure that the vehicle can reach a certain vehicle state that is an equilibrium state in a given hybrid mode at certain locations and at certain time instances. Between the consecutive equilibrium vehicle states the vehicle can be controlled by various ways, of which three examples are given below.

In a first example, the vehicle is controlled between the consecutive equilibrium vehicle states based on a position. For example, the vehicle can be controlled to follow the shortest path between the positions of the consecutive equilibrium vehicle states, or the vehicle can be controlled to follow the smoothest path between the locations corresponding to the consecutive vehicle states of the trajectory such as a spline curve. This control approach is preferred in cases where spatial constraints might limit the motion of the vehicle, for example, when the motion is a parking manoeuvre.

In a second example, the vehicle is time-controlled between the consecutive equilibrium vehicle states. This control method is preferred in application wherein the timing of the trajectory is crucial, e.g., for controlling a racing car. In this example the vehicle might be controlled to follow the trajectory by using the least possible time between each consecutive equilibrium vehicle states.

In a third example, the control of the vehicle is based both on time and location. In normal traffic situations this type of transient control method is preferred between the consecutive equilibrium vehicle states of the trajectory, because the motion of the vehicle needs to be adapted to the traffic, wherein the position of other vehicles or other objects (such as pedestrians) changes in time, thus the control method needs to adapt to a changing environment in space and time.

The approach described above highly increases the flexibility of the control method while ensuring the safety and controllability of the vehicle. As a result, accidents can be more easily avoided.

The method and system according to the invention ensures that in the course of motion (i.e., along the trajectory of the vehicle) a next equilibrium vehicle state can be reached from an earlier equilibrium vehicle state.

The method and system according to the invention therefore can be used in any autonomous motion system, including self-driving vehicles.

BRIEF DESCRIPTION OF THE DRAWINGS

Preferred embodiments of the invention are described below by way of example with reference to the following drawings, where.

MODES FOR CARRYING OUT THE INVENTION

The invention relates to a method for autonomous motion control and motion planning of a vehicle. The vehicle is preferably an autonomous vehicle such as a motorcycle, a car, a bus, a truck, etc. The method allows for complete motion control and motion planning of the vehicle without the need of a driver interaction.

The method according to the invention comprises a step of providing an initial vehicle position, an initial time instance and an initial vehicle state characterized by at least one vehicle state parameter. The initial vehicle position is a starting position from which the movement of the vehicle is controlled, e.g., a position from which the vehicle starts its motion. The initial vehicle position is preferably defined in a coordinate system and comprises $x_0$ and $y_0$ initial coordinates of the vehicle, wherein $x_0$ is a longitudinal coordinate and $y_0$ is a lateral coordinate in respect to the vehicle. Other coordinate systems and other coordinate representations can also be used to define the initial position of the vehicle.

The initial time instance is a time instance when the vehicle starts its motion from the initial vehicle position.

The initial vehicle state defines a state of the vehicle in the initial vehicle position at the initial time instance. The vehicle state parameter characterizing the state of the vehicle as well as the initial vehicle state is preferably a yaw rate, a longitudinal velocity or a lateral velocity of the vehicle, i.e., the vehicle state parameter is a parameter or a variable that characterizes a state of the vehicle. A vehicle state preferably comprises a value of at least one of the vehicle state parameters at a given time instance. Preferably, the initial vehicle state comprises the yaw rate, the longitudinal velocity or the lateral velocity of the vehicle at the initial time instance. Furthermore, the initial vehicle state preferably comprises one or more further vehicle parameters, such as a steering angle, a mass of the vehicle, etc. at the initial time instance.

Figure 1:
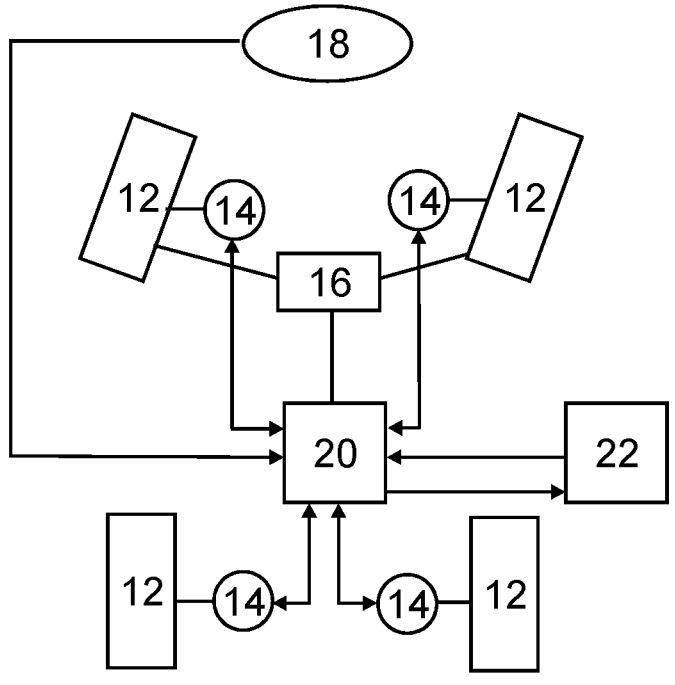
FIG. 1 is a preferred setup of the system according to the invention.

The initial vehicle state is preferably determined on the basis of a signal of a sensor and/or of a status of at least one vehicle actuator. The sensor is preferably a steering angle sensor, a torque sensor, a wheel speed sensor, an odometry sensor, a camera, a radar or a lidar, and the vehicle actuator is preferably a steering system, a drive system or a brake system. Furthermore, a vehicle actuator can also be a wheel suspension system that is capable of changing an alignment of at least one of the wheels, wherein the alignment corresponds to a caster angle, a camber angle, a toe-in angle or toe-out angle of one or more of the wheels. Such changes of the alignment of the wheels may change the forces applied on the tires, for example, in a longitudinal or a lateral direction, e.g., by resulting in a tilt of a tire that can change the longitudinal or lateral forces acting on that tire. A preferred setup of the vehicle actuators and sensors is shown in FIG. 1.

The method according to the invention also comprises a step of providing a parameter value range for the vehicle state parameter and a step-value of a step-parameter. Preferably, the parameter value range and the step-value of the step-parameter is provided by a motion planner unit 22 of the vehicle (see FIG. 1).

The parameter value range and the step-value of the step-parameter is preferably determined based on a second set of parameters, such as a parameter of a map, a parameter of a free space around the vehicle, a parameter of a moving or stationary obstacle around the vehicle. The map is preferably a mission map, wherein the parameter of a map is preferably a location, and the parameter of the free space around the vehicle and the parameter of a moving or a stationary obstacle around the vehicle is preferably determined from a signal of a sensor of the vehicle, such as a camera, a radar or a lidar. A moving or a stationary obstacle around the vehicle can be an other vehicle, a pedestrian, an animal, a building, a road sign, or any other object that can affect or restrict the movement of the vehicle.

In cases when the free space around the vehicle is sufficiently large, and no obstacles are around the vehicle, larger timesteps can be taken, as no object or obstacle is expected to affect the motion of the vehicle. In cases when the free space around the vehicle is more limited, for example because of some obstacles, such as other vehicles are in the vicinity of the vehicle, then preferably shorter time intervals are to be taken as timesteps in order to safely navigate the vehicle and to avoid any collisions or accidents. An advantage of shorter timesteps is that it allows for a faster reaction to the movements of any obstacles and evading manoeuvres can be carried out. When no obstacles are to be expected to affect the motion of the vehicle, then taking larger timesteps can decrease the computational needs of the method.

The method according to the invention further comprises a step of calculating a set of feasible vehicle states comprising feasible vehicle states for parameter values within the parameter value range, wherein the feasible vehicle states are equilibrium states of the vehicle state parameter. An arbitrary linear, or non-linear system can be defined by a set of differential equations as follows:

$$\dot{x}=f(x,u)$$

, wherein x is a vector of the state variables and u is a control input vector. Equilibrium states of the state variables can be calculated for each possible control input vector by solving the above differential equation in a case when all the time derivatives of the state variables are equal to zero. In the case of underactuated systems (where the number of the control inputs is less than the number of the vehicle states), equilibrium states occur only at special locations in the state-space.

According to the invention, the vehicle is defined as a hybrid dynamical system having at least two hybrid modes, wherein the at least two hybrid modes altogether describe the continuous dynamic behaviours and the discrete dynamic behaviours of the vehicle. The hybrid modes are defined based on one or more hybrid mode parameters, wherein the hybrid mode parameter is preferably a tire-road interaction saturation state of a wheel of the vehicle, an availability of a vehicle actuator, a failure mode of a vehicle actuator, an availability of a sensor, or a failure mode of a sensor. As an example, based on a saturation state of one of the wheels, two hybrid modes can be defined, i.e., one hybrid mode in which said wheel is in saturation and another hybrid mode in which said wheel is not in saturation. Similarly, hybrid modes can be defined for each of the wheels, thus for a vehicle having two wheels, at least four hybrid modes can be defined, and for a vehicle having four wheels, at least sixteen hybrid modes can be defined based on the saturation states of the wheels.

Further hybrid modes can be defined based on the availability of the at least one vehicle actuator, because, for example, a reduced availability or a complete loss of one of the vehicle actuators can also lead to a discrete dynamic behaviour of the vehicle. A failure mode, such as a reduced controllability of one of the vehicle actuators has a similar effect on the dynamics of the vehicle, thus a number of failure modes of each vehicle actuator also multiplies the number of possible hybrid modes, as well as an unavailability of a sensor.

The above hybrid modes can be interpreted as pairwise disjoint sets of vehicle states, and the union of all hybrid modes comprises all the possible vehicle states. Accordingly, each vehicle state (including each feasible vehicle state) can be categorized into one of the hybrid modes. The number of hybrid modes can be an integer or infinity; the latter is the case if separate hybrid modes are defined for each value of a continuously changing vehicle parameter, e.g., for each possible reduced turning speed of the steering wheel.

The set of feasible vehicle states are calculated by a motion control unit 20 for each hybrid modes, for an exemplary set of feasible vehicle states see FIG. 1.

The set of feasible vehicle states is preferably calculated for a discrete set of parameter values within the parameter value range, more preferably the discrete set of parameter values comprises uniformly distributed parameter values within the parameter value range. For example, the set of feasible vehicle states is calculated for a longitudinal velocity $v_x$ of the vehicle, wherein the longitudinal velocity $v_x$ varies in the range from 5 m/s to 10 m/s with discrete increments of 1 m/s, thus the discrete set of parameter values are 5 m/s; 6 m/s; 7 m/s; 8 m/s; 9 m/s; and 10 m/s.

As a further example, the set of feasible vehicle states are calculated for a longitudinal velocity $v_x$ of the vehicle in the range of 5-15 m/s having 1 m/s increments, a lateral velocity $v_y$ of the vehicle in the range of −1-1 m/s having 0.1 m/s increments, and a yaw rate r of the vehicle in the range of −0.5-0.5 rad/s having 0.1 rad/s increments.

The set of feasible vehicle states can also be a continuous set calculated for a continuous interval of parameter values within the parameter value range, or the set of feasible vehicle states can also be calculated for parameter values comprising discrete values and continuous intervals within the parameter value range.

The calculation of the set of feasible vehicle states is preferably based on a first set of parameters comprising at least one of the following: vehicle parameters, actuator capabilities and environmental conditions. The first set of parameters is determined from a signal of a sensor of the vehicle and/or a status of an actuator of the vehicle.

The method according to the invention has further a step of calculating a set of reachable vehicle states. According to the invention, each of the reachable vehicle states is a feasible vehicle state that can be reached from a same feasible vehicle state or from an other feasible vehicle state within a step-value of a step-parameter, wherein the step-parameter is preferably a temporal parameter or a spatial parameter, and the step-value is preferably a timestep or a distance. The reachable vehicle states are calculated by the motion control unit 20.

The method according to the invention further includes a step of constructing a vehicle trajectory, wherein the vehicle trajectory is a sequence of consecutive feasible vehicle states starting from the initial vehicle state and the initial vehicle position. The vehicle trajectory is constructed by the motion planner unit 22. The vehicle trajectory comprises for each consecutive feasible vehicle state a vehicle position and a time instance, wherein the consecutive feasible vehicle states of the vehicle trajectory are reachable vehicle states on the basis of a previous feasible vehicle state. Each vehicle position is determined on the basis of the previous feasible vehicle state, of a vehicle position belonging to the previous feasible vehicle state, and of the step-value of the step-parameter, such as a timestep (i.e., a distance that can be travelled within the timestep) and/or a distance. The time instance for each feasible vehicle state of the trajectory is determined on the basis of the previous feasible vehicle state, of a previous time instance belonging to the previous feasible vehicle state, and of the step-value of the step-parameter such as a timestep and/or a distance (i.e., a time required to travel that distance).

The method according to the invention further includes a step of controlling, by the motion control unit 20, at least one vehicle actuator to drive the vehicle to each of the consecutive feasible vehicle states of the vehicle trajectory.

Furthermore, the invention relates to a system for autonomous motion control of a vehicle 10, wherein the system comprises at least one vehicle actuator, a motion control unit 20 connected to the at least one vehicle actuator, and a motion planner unit 22 connected to the motion control unit 20. The motion control unit 20 is configured to receive a parameter value range for a vehicle state parameter and a step-value of a step-parameter, wherein the step-parameter is preferably a spatial and/or a temporal parameter and the step-value is a timestep and/or a distance, calculate a set of feasible vehicle states comprising feasible vehicle states for parameter values within the parameter value range, wherein the feasible vehicle states are equilibrium states of the vehicle state parameter, calculate a set of reachable vehicle states, wherein each of the reachable vehicle states is a feasible vehicle state that can be reached within the step-value of the step-parameter from a same feasible vehicle state or from an other feasible vehicle state, and control at least one vehicle actuator to drive the vehicle 10 according to a vehicle trajectory, wherein the vehicle trajectory is a sequence of consecutive feasible vehicle states starting from an initial vehicle state and an initial vehicle position and comprising for each consecutive feasible vehicle state of the vehicle trajectory a vehicle position and a time instance, wherein the consecutive feasible vehicle states of the vehicle trajectory are reachable vehicle states on the basis of a previous feasible vehicle state, of a previous position of the vehicle in the previous feasible vehicle state, of a previous time instance of the previous feasible vehicle state, and of the step-value of the step-parameter.

Preferably, the motion control unit 20 is configured to handle all the available vehicle actuators of the vehicle 10 and thus it is capable of influencing the vehicle states, wherein the vehicle actuators may include the steering system 16, the propulsion system 14 including the drive system and the braking system, etc. The motion control unit 20 preferably has full knowledge about the vehicle dynamics, its parameters and capabilities, and environmental conditions affecting the vehicle motion, e.g., actual and expected road grip level during the current or planned vehicle trajectory within the time horizon (execution time) and the space horizon. The motion control unit 20 is intended to work together with the motion planner unit 22 of vehicle 10. The motion planner unit 22 is preferably an independent unit or subsystem from the motion control unit 20.

The system according to the invention preferably further comprises a sensor system 18 connected to the motion control unit 20, and the sensor system 18 is preferably adapted to provide the motion control unit 20 with an initial vehicle position and an initial vehicle state. The sensor system 18 is preferably further adapted to provide the motion control unit 20 with a first set of parameters for calculating the set of feasible vehicle states, wherein the first set of parameters comprises at least one of the following: vehicle parameters, actuator capabilities and environmental conditions. Preferably, the sensor system 18 comprises at least one sensor, wherein the sensor is a steering angle sensor, a torque sensor, a wheel speed sensor, an odometry sensor, a camera, a radar or a lidar.

The motion planner unit 22 is configured to construct the vehicle trajectory. The motion planner unit 22 shall provide a mission planning, behaviour planning and trajectory planning method for the vehicle 10 based on the knowledge of a map, preferably a mission map, free spaces around the vehicle 10, moving and static obstacles in the vicinity of the vehicle 10, etc. The method provided by the invention calculates a set of feasible vehicle states from which the motion planner unit 22 can construct a vehicle trajectory (in time and space) for a planning horizon including a time horizon and a space horizon. The time horizon is a time interval within which the vehicle trajectory is to be planned, and the space horizon corresponds to a spatial region in which the vehicle 10 moves in the course of the vehicle trajectory. The space horizon may include a starting location from which the vehicle 10 starts, and an aimed location into which the vehicle 10 is to be driven.

Additionally, the motion control unit 20 provides a set of reachable vehicle states in for each of the feasible vehicle states. The set of reachable vehicle states comprises for each of the given feasible vehicle states a set of feasible vehicle states that can be reached from the given feasible vehicle states within the step-value of the step-parameter.

For example, the step-parameter can be a temporal parameter and its step-value can be a timestep; in this case the set of reachable vehicle states comprises feasible vehicles states that can be reached from a previous feasible state within the timestep.

As another example, the step-parameter can be a spatial parameter and its step-value can be a distance; in this case the set of reachable vehicle states comprises feasible vehicles states that can be reached from a previous feasible state within the given distance.

In a further example, the step-parameter can be both a temporal and spatial parameter (e.g., a spatio-temporal parameter), and its step-value can be a combination of a timestep and a distance. According to this example, the set of reachable vehicle states are feasible vehicle states that can be reached within the timestep and the distance.

Considering this information, the motion planner unit 22 is able to construct the vehicle trajectory (a future vehicle trajectory or a reference vehicle trajectory) in a way that each subsequent points of the vehicle trajectory is from the set of feasible vehicle states that can be reached from a previous vehicle state (i.e., the set of reachable vehicle states) in the available time horizon (timeframe). The above described three approaches towards the determination of the set of reachable vehicle states can be used for constructing the trajectory. For applications wherein the vehicle is to be controlled in a parking situation, the spatial-based approach is preferred. For time-critical applications, such as car-racing, a time-based approach is preferred when constructing the trajectory, thus the trajectory can be completed within the least amount of time. In cases where the vehicle is expected to be driven in a classical traffic situation, a combined spatio-temporal approach is preferred, because not only the available space for the movement of the controlled vehicle, but timing is also crucial, especially for avoiding accidents.

It is also to be noted that due to the fact that the feasible vehicle states are computed for each hybrid modes, the set of reachable vehicle states can also include feasible vehicle states corresponding to different hybrid state. Accordingly, the consecutive feasible vehicle states of trajectory can also belong to different hybrid states, thus the method according to the invention allows intentional change of the hybrid modes during the trajectory. This allows for a more flexible motion planning with more possible trajectories to follow, and more possibilities for avoiding accidents and contribute to a safer or more agile motion control. For example, the invention can enable a rotation of a vehicle body around an arbitrarily chosen cornering centre point at any speeds, wherein the cornering centre point is a centre point of a circle being followed by the vehicle upon turning. The cornering centre point is typically outside of the vehicle; however, it can also be located within the position of the wheels of the vehicle.

Transitions between the consecutive feasible vehicle states of the vehicle trajectory are preferably controlled by the motion control unit 20 via a position based, a time based or a space-time based control. Preferably, the control of the transitions between the consecutive feasible vehicle states of the vehicle trajectory and the type of the step-parameter (i.e., being a temporal, a spatial or a spatio-temporal parameter) are independent. For example, even if the step-parameter is a temporal parameter which has a timestep as a step-value, the transients between the consecutive feasible vehicle states can be controlled via a position based control.

For applications where spatial constraints might limit the motion of the vehicle, for example, at parking, the vehicle is preferably controlled between the consecutive feasible vehicle states of the vehicle trajectory based on a position. For example, the vehicle can be controlled to follow the shortest path between the positions of the consecutive feasible vehicle states, or the vehicle can be controlled to follow the smoothest path between the locations corresponding to the consecutive feasible vehicle states such as a spline curve.

In application wherein the timing of the vehicle trajectory is crucial, e.g., for controlling a racing car, the transients between the consecutive feasible vehicle states can be controlled via a time based control. In this case, the vehicle might be controlled by using the least possible time between each consecutive feasible vehicle states of the vehicle trajectory.

In normal traffic situations the control of the vehicle is preferably based both on time and location, wherein the transients between the consecutive feasible vehicle states are preferably controlled via a spatio-temporal control. This approach takes into account that the motion of the vehicle needs to be adapted to the traffic, e.g., to the position of other vehicles or other objects (such as pedestrians) which can change in time.

Preferably, the way of handling the transitions between the consecutive feasible vehicle states of the vehicle trajectory is not fixed, during the route of the vehicle several different transition-handling methods can be used, preferably according to the actual traffic situation.

The motion control unit 20 preferably also simulates the vehicle trajectory as an expected future vehicle path and sends it to the motion planner unit 22 for inspection. Based on this new information, the motion planner unit 22 can replan the vehicle trajectory if it is necessary. When the vehicle trajectory is approved, the motion control unit 20 performs the requested manoeuvre and drives the vehicle 10 into each of the consecutive feasible vehicle states corresponding to the vehicle trajectory.

A preferred setup of a vehicle 10 to be controlled by the method according to the invention illustrated in FIG. 1. The illustrated setup also comprises a preferred implementation of the system according to the invention. The vehicle 10 comprises a motion control unit 20, a motion planner unit 22 connected to the motion control unit 20, and a steering system 16 and a propulsion system 14 as vehicle actuators. Preferably, the vehicle 10 comprises a sensor system 18 connected to the motion control unit 20.

The vehicle 10 preferably further comprises a wheel 12, wherein the propulsion system 14 is connected to the wheel 12, and the steering system 16 is also connected to the wheel 12, i.e., the wheel 12 can be understood as a part of either the steering system 16 or the propulsion system 14. The propulsion system 14 preferably comprises a drive system and a brake system to provide a drive and also a brake force, respectively, to the wheel 12.

In case the vehicle 10 comprises more than one wheel 12, preferably an individual unit of the propulsion system 14 is connected to each of the wheels 12, thus the vehicle 10 can be more precisely controlled by individual control of each wheel 12. The steering system 16 is preferably connected to a front wheel 12 or to front wheels 12, but the steering system can also be connected to all of the wheels 12, or to a rear wheel 12 or to rear wheels 12.

The sensor system 18 preferably comprises a camera, a radar, a lidar, an inertial measurement unit, a steering angle sensor, a wheel speed sensor, an odometry sensor, a GPS system, a torque system, etc.

An example for carrying out the method according to the invention is described below.

The motion planner unit 22 defines a planning horizon comprising a time horizon and a space horizon for a (local) trajectory planning. It is advisable to define the time horizon and the space horizon as temporal and spatial intervals respectively, in which the vehicle and environmental conditions, e.g., expected road grip on different locations of the road, trajectories of other moving obstacles, road boundaries, etc. are known with a high probability. Of course, the planning horizon can be varied in each execution of the method according to the invention. It is also possible to define the planning horizon as a set of consecutive time horizons and consecutive space horizons so that the vehicle and road conditions are not expected to change within the individual time horizons and the space horizons.

After defining the planning horizon, an initial and preferably a requested final vehicle state and vehicle position can be defined:

Initial position=$X_0(t_0),Y_0(t_0)$

Initial vehicle state=$\psi_0(t_0),r(t_0),v_{x0}(t_0),v_{y0}(t_0)$

Final position=$X_f(t_f),Y_f(t_f)$

Final vehicle state=$\psi_f(t_f),r(t_f)v_{xf}(t_f)v_{yf}(t_f)$, wherein
$t_0$ denotes an initial time instance,
$X_0$ denotes a longitudinal coordinate of the initial position,
$Y_0$ denotes a lateral coordinate of the initial position,
$\psi_0$ denotes a vehicle heading angle in the initial position,
r denotes a yaw rate,
$v_{x0}$ denotes a longitudinal velocity (speed) in the initial position,
$v_{y0}$ denotes a lateral velocity (speed) in the initial position,
$t_f$ denotes a final time instance,
$X_f$ denotes a longitudinal coordinate of the final position,
$Y_f$ denotes a lateral coordinate of the final position,
$\psi_f$ denotes a vehicle heading angle in the final position,
$v_{xf}$ denotes a longitudinal velocity (speed) in the final position, and
$v_{yf}$ denotes a lateral velocity (speed) in the final position.

Preferably, the time horizon is a time interval from $t_0$ to $t_f$, and the space horizon is a spatial region spanned by the coordinates $X_0$, $Y_0$, $X_f$ and $Y_f$.

The motion planner unit 22 comprising a motion planning algorithm requests the calculation of a set of feasible vehicle states from the motion control unit 20. The motion planner unit 22 defines the parameter value range for the vehicle state parameters by defining a domain and a resolution, and the motion planner unit 22 also defines a timestep. In this example, the vehicle state parameters are a longitudinal velocity $v_x$ of the vehicle in the range of 5-15 m/s having 1 m/s increments, a lateral velocity $v_y$ of the vehicle in the range of −1-1 m/s having 0.1 m/s increments, and a yaw rate r of the vehicle in the range of −0.5-0.5 rad/s having 0.1 rad/s increments.

The motion control unit 20 comprising a motion control algorithm then calculates the set of feasible vehicle states in the above-defined domain and resolution. The calculation is performed based on the knowledge of the vehicle dynamical behaviour and parameters, actuator capabilities, and environmental conditions (e.g., expected road grip level on the planning horizon).

The motion control unit 20 receives one or more inputs, the inputs preferably being the following:
an actual steering angle and speed preferably received from a steering angle sensor,
an actual driving or braking torque, that is acting on the individual wheels 12 of the vehicle 10, preferably from a direct measurement of a torque sensor or estimated by the propulsion system (e.g., a control unit of the drive system and/or brake system),
a longitudinal and a lateral speed, preferably measured by a dual antenna dGPS system, or by an optical velocity measurement unit, or it can be estimated by vehicle dynamics signals,
a yaw rate and a direction (heading) of the vehicle 10, preferably measured by a built-in inertial measurement unit (IMU) of the vehicle 10 or by a dual antenna dGPS system,
an actual and a future road grip level on the planned future vehicle trajectory, e.g., in a form of a friction map, preferably determined by one or more signals having a source of
a preliminary measurement or estimation about the road by an other car, a measurement vehicle, or an infrastructure sensor,
a measurement or estimation of an ABS or ESP system of the vehicle 10 or other vehicles on the road,
a camera, a radar, or a lidar measurement of the vehicle 10 (ego vehicle) about the road conditions, etc.

The motion control unit 20 sends the calculated set of feasible vehicle states back to the motion planner unit 22. These feasible vehicle states are calculated as equilibrium points of the vehicle dynamics (yaw dynamics, longitudinal velocity dynamics and lateral velocity dynamics) for each of the possible hybrid modes. Based on the vehicle actuator setup, the feasible vehicle states may include equilibrium states unavailable for a human driver due to the lack of actuation capabilities (e.g., the driver cannot brake the front wheel only while applying drive torque on the rear wheels and turn the steering wheel).

The set of feasible vehicle states can be summarized as follows:

$$\begin{bmatrix} r_1 & v_{x1} & v_{y1} \\ r_2 & v_{x1} & v_{y2} \\ \vdots & \vdots & \vdots \\ r_n & v_{xn} & v_{yn} \end{bmatrix},$$

wherein $r_i$ is a yaw rate, $v_{xi}$ is a longitudinal velocity, and $v_{yi}$ is a lateral velocity, wherein i is an index of the elements of the feasible vehicle states.

Then, the motion control unit 20 calculates a set of reachable states from each of the above element of the feasible vehicle states for different step-values of the step-parameter, for example, for different timesteps and/or distances. It will define a manifold of the reachable states in the state space.

The motion planner unit 22 constructs a vehicle trajectory as a sequence of consecutive feasible vehicle states in time and space that are reachable after each other. The reachable set is used as a boundary condition for the motion planner unit 22 while creating an optimal trajectory for the planning horizon.

The motion planner unit 22 sends back a requested vehicle trajectory in the form of cornerstones (as a sequence of feasible vehicle states attached to future locations and time instances). Thus, the vehicle trajectory includes information about the position of the vehicle 10, the time instance when the vehicle 10 reaches the position, and the vehicle state corresponding to that position and time instance.

The motion control unit 20 preferably uses a linear parameter-varying (LPV) model to determine an expected future parameter range on the basis of the requested vehicle trajectory.

Based on the LPV model, a self-scheduled H-infinity method is designed to provide robustness for uncertainties and meet the performance requirements in this example. Other models and methods can also be used to predict and control the future behaviour of the vehicle 10 on the basis of the requested vehicle trajectory, e.g., with a suitable learning algorithm or a model predictive control.

Figure 7:
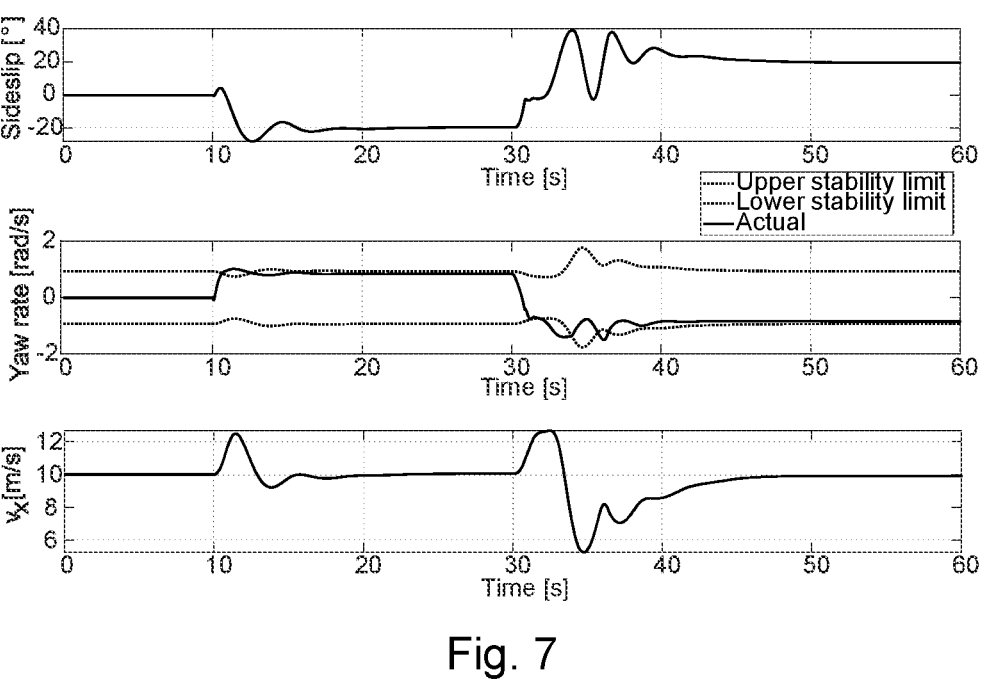
FIG. 7 shows a time evolution of vehicle states including transitions across different elements of a set of feasible vehicle states.

Between the equilibrium points (elements of the set of feasible vehicle states) that span out the vehicle trajectory, transient behaviour may occur that is interpolated by the system. During the transient phases, vehicle states can far exceed the boundaries defined by a steady-state vehicle operation. For example, the actual yaw rate can exceed the maximal yaw rate defined by $r=\mu g/v_x$. Such transients are shown in FIG. 7 as an example. This feature of the invention provides the possibility of changing extremely fast the vehicle states, hence a very flexible motion of the vehicle 10 is possible. Moreover, after such a transient operation, the motion control unit 20 guarantees that the vehicle 10 will be settle in the requested next equilibrium point of the vehicle trajectory, therefore provides safe operation to the vehicle 10. With the fast transients, the car could perform, for example, quick evasive manoeuvres in critical situations.

Preferably, between the feasible vehicle states of the trajectory, the vehicle can be controlled based on a position and/or a time as it has been discussed previously. Position-based control is preferably used in static environments such as during parking, while time-based control is preferred in time-critical applications such as in car-racing. In normal traffic conditions a combined time and position-based control is preferred as the motion of the vehicle needs to be adapted to the actual traffic which is an environment that dynamically changes in space and time. In order to predict the vehicle's motion during the whole planning horizon, the motion control unit 20 performs a simulation of the entire vehicle trajectory with the expected vehicle dynamics, conditions, and current controller and vehicle actuator setup.

Based on the simulation, the fine-tuning of at least one control parameter can be performed to follow the reference points (equilibrium points) of the vehicle trajectory, defined by the motion planner unit 22, as accurately as possible. The fine-tuning can be done, for example, by modifying the weighting functions of the model with a reinforcement learning algorithm.

The motion control unit 20 sends the vehicle's expected future vehicle trajectory (which is resulted from a final simulation) to the motion planner unit 22 for approval. If the motion planner unit 22 accepts the result, the motion control unit 20 starts the execution of the vehicle trajectory. Otherwise, the motion planner unit 22 can recalculate the vehicle trajectory.

In order to drive the vehicle 10 along the approved vehicle trajectory, the motion control unit 20 preferably has information about the mass of the vehicle 10 and coordinates of the center of gravity (C.G) of the vehicle 10, preferably provided by preliminary measurements or an estimation, one or more vehicle tire parameters, such as cornering stiffness, tire pressure, thread temperature and condition, friction coefficient, wherein the tire parameters can be provided by a data from a catalogue, a preliminarily measurement or an estimation, a vehicle setup and a vehicle actuator setup comprising endstop positions of the steering system 16, and its dynamic limits, a vehicle axle configuration, capabilities of the drive system, and
capabilities of the brake system.

The execution of the method then jumps back to the beginning and a new calculation can be performed to include all the new information available from the latest measurements and estimations by the sensors.

Figure 2:
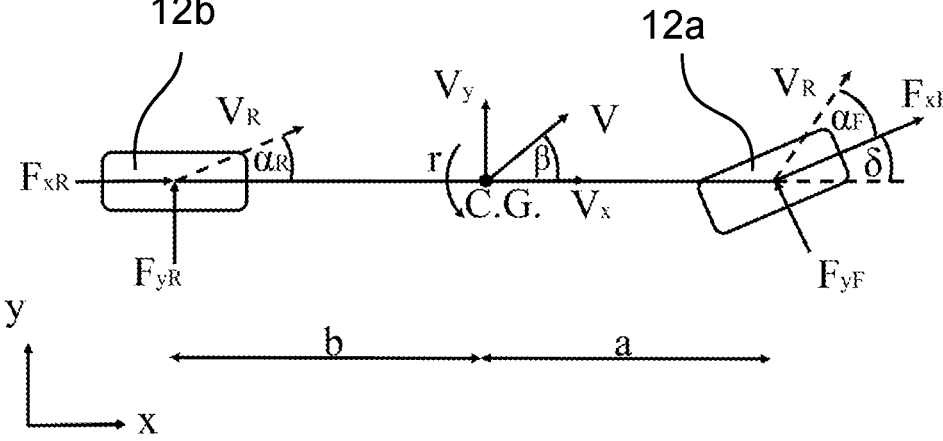
FIG. 2 is a one-track model of a vehicle with main notations.

Details about the calculation of the set of feasible vehicle states are discussed in connection with FIG. 2, wherein main notation of a preferred vehicle model are shown. The vehicle model for the below calculations is a one-track or bicycle model of a vehicle 10 (see FIGS. 3 and 4), comprising two wheels 12, a front wheel 12a and a rear wheel 12b. Both the front wheel 12a and the rear wheel 12b comprise tires.

The vehicle model can be defined initiating from the Newton-Euler equation of motion, in a vehicle body coordinate frame, i.e., a coordinate system attached to the vehicle 10. A one-track dynamical model can represent the vehicle operation with suitable accuracy and limited computational needs due to the applied simplifications (e.g., less wheels 12).

The equations of motion are defined in the following.

Based on the moment balance around a vertical axis, the yaw dynamics of the vehicle 10 can be calculated as:

$$\dot{r} = \frac{a(F_{xF}\sin\delta + F_{yF}\cos\delta) - bF_{yR}}{I_{zz}},$$

where r is the yaw rate, $\dot{r}$ is a time derivative of the yaw rate, a is the front axle distance from the centre of gravity (C.G.), $F_{xF}$ is the longitudinal force on a front wheel 12a, $\delta$ is the steering angle, $F_{yF}$ and $F_{yR}$ are the lateral forces on the front wheel 12a and rear wheel 12b, respectively, b is the rear axle distance from the centre of gravity, and $I_{zz}$ is the vehicle body inertia around the vertical axis.

The lateral dynamics of the vehicle 10 can be described as:

$$\dot{v}_y = \frac{F_{xF}\sin\delta + F_{yF}\cos\delta + F_{yR}}{m} - rv_x,$$

where $v_y$ is the lateral speed, $\dot{v}_y$ is a time derivative of the lateral speed, $v_x$ is the longitudinal speed and m is the vehicle mass.

The longitudinal dynamics of the vehicle 10 can be described as:

$$\dot{v}_x = \frac{F_{xR} - F_{yF}\sin\delta + F_{xF}\cos\delta}{m} + rv_y,$$

where $\dot{v}_x$ is a time derivative of the longitudinal speed, $F_{xR}$ is the longitudinal force on the rear wheel 12b.

The tire sideslip angle is defined as:

$$\beta = a\tan\frac{v_y}{v_x}.$$

The sideslip angles $\alpha_F$ and $\alpha_R$ of the front wheel 12a and rear wheel 12b, respectively, can be calculated from the tire force as follows:

$$\alpha_F = a\tan\left(\frac{v_y + ar}{v_x}\right) - \delta$$

-continued $$\alpha_R = a\tan\left(\frac{v_y - br)}{v_x}\right)$$

The tire forces can be modelled by a brush tire model. Combined slip behaviour can also be included by a friction circle approximation. Therefore, front tire forces can be calculated as:

$$F_{yF} = -C_{\alpha F} \tan \alpha_F +$$

$$\frac{C_{\alpha F}^2}{3\xi_F\mu_F F_{zF}}|\tan \alpha_F|\tan \alpha_F - \frac{C_{\alpha F}^3}{27\xi_F^2\mu_F^2 F_{zF}^2}\tan^3\alpha_F, \text{ if } |\alpha_F| \le \alpha_{slF}$$

$$F_{yF} = -\xi_F\mu_F F_{zF}sgn \, \alpha_F, \text{ if } |\alpha_F| > \alpha_{slF}$$

A derating factor $\xi_F$ based on the front tire force is:

$$\xi_F = \frac{\sqrt{(\mu_F F_{zF})^2 - F_{xF}^2}}{\mu F_{zR}}.$$

A slip value $\alpha_{slF}$ corresponding to the friction limit is:

$$\alpha_{slF} = \arctan\left(\frac{3\xi_F\mu_F F_{zF}}{C_{\alpha F}}\right).$$

Rear tire forces can be calculated as:

$$F_{yR} = -C_{\alpha R} \tan \alpha_R +$$

$$\frac{C_{\alpha R}^2}{3\xi_R\mu_R F_{zR}}|\tan \alpha_R|\tan \alpha_R - \frac{C_{\alpha R}^3}{27\xi_R^2\mu_R^2 F_{zR}^2}\tan^3\alpha_R, \text{ if } |\alpha_R| \le \alpha_{slR},$$

and $$F_{yR} = -\xi_R\mu_R F_{zR}sgn \, \alpha_R, \text{ if } |\alpha_R| > \alpha_{slR}.$$

A derating factor $\xi_R$ based on the rear tire force is:

$$\xi_R = \frac{\sqrt{(\mu_R F_{zR})^2 - F_{xR}^2}}{\mu F_{zR}}.$$

A slip value $\alpha_{slR}$ corresponding to the friction limit is:

$$\alpha_{slR} = \arctan\left(\frac{3\xi_R\mu_R F_{zR}}{C_{\alpha R}}\right).$$

The vehicle states of the model can be summarized as:

$$x=[v_y, v_x, r].$$

The inputs of the model can be summarized as $$u=[\delta, F_{xF}, F_{xR}].$$

Hence, the vehicle state space of the model can be defined as $$\begin{bmatrix} \dot{v}_y \\ \dot{v}_x \\ \dot{r} \end{bmatrix} = \begin{bmatrix} f_1(x, u, h) \\ f_2(x, u, h) \\ f_3(x, u, h) \end{bmatrix}$$

The above tire behaviour h defines four different hybrid modes of the model having one front wheel 12*a* and a rear wheel 12*b*, wherein different hybrid modes can be determined by the saturation states of the front wheel 12*a* and rear wheel 12*b*. The saturation states of two wheels define four hybrid modes according to the following:

both wheels 12*a*, 12*b* are non-saturated (h=1 hybrid mode), the front wheel 12*a* is non-saturated, the rear wheel 12*b* is saturated (h=2 hybrid mode), the front wheel 12*a* is saturated, the rear wheel 12*b* is non-saturated (h=3 hybrid mode), and both wheels 12*a*, 12*b* are saturated (h=4 hybrid mode).

An availability or a failure mode of a vehicle actuator can result in further hybrid modes as well as an availability of a sensor, as it has been discussed previously.

The number of hybrid modes is a result of the number of wheels of the vehicle and of the saturation states of the wheels, and of the availability of the vehicle actuators, the failure modes of the vehicle actuators, the availability of the sensors, etc. The number of hybrid modes (as already discussed above) can be an integer, for example, when each parameter that plays a role in defining the hybrid modes have discrete states, but in certain cases an infinite number of hybrid modes are also possible, for example, when a failure mode results in continuously changing values such as possible steering speeds of the steering wheel, wherein each possible steering speed can define a new hybrid mode.

As a wheel typically can have two states with respect to saturation, i.e., a saturated and a non-saturated state, thus, each wheel can multiply the number of hybrid modes by 2, corresponding to whether or not the tire of the wheel is saturated. Due to this, vehicles (vehicle models) having two wheels can have four hybrid modes, and vehicles having four wheels can have sixteen hybrid modes, as each wheel can be in either one of the above two states. The number of these hybrid modes can me multiplied based on the actual actuator and sensor setup of the vehicle and their availability and failure modes.

The motion control unit 20 calculates the feasible vehicle states as steady-state equilibrium states of the vehicle model. The equilibrium states correspond to equilibrium points of the vehicle model, i.e., where the time derivatives of all vehicle state parameters are equal to zero as follows:

$$\dot{r} = \frac{(F_{xF} \sin \delta + F_{yF} \cos \delta) - bF_{yR}}{I_{ZZ}} = 0$$

$$\dot{v}_y = \frac{F_{xF} \sin \delta + F_{yF} \cos \delta + F_{yR}}{m} - rv_x = 0$$

$$\dot{v}_x = \frac{F_{xR} - F_{yF} \sin \delta + F_{xF} \cos \delta}{m} + rv_y = 0$$

The above set of three algebraic equations comprises six unknown variables: r, $v_x$, $v_y$, $\delta$, $F_{xF}$, $F_{xR}$. Thus, the above problem can only be solved if three of the variables is fixed to a given value.

Based on the number of vehicle actuators (control inputs), the system can be underactuated (e.g., steering and rear-wheel drive), fully actuated (steering, front and rear wheel torque), or overactuated (e.g., steering, independent traction forces on the left and right wheels at the front and rear axles). The provided motion control system and method considers the vehicle's capabilities with respect to the vehicle actuator setup and calculates the set of feasible vehicle states accordingly.

Exemplary sets of feasible vehicle states are shown in FIGS. 6-12, derived from the above one-track model of the vehicle 10.

In cases, when each four wheels 12 of the vehicle 10 can be controlled by an individual torque, a two-track model of the vehicle 10 can be used.

The vehicle state equations of the two-track model can be defined in the following form, similar to the one-track case (based on Reza N. Jazar: Advanced Vehicle Dynamics, Springer International Publishing, 2019, ISBN 978-3-030-13062-6, DOI 10.1007/978-3-030-13062-6):

$$\dot{v}_y = \frac{F_y}{m} - rv_x$$

$$\dot{v}_x = \frac{F_x}{m} + rv_y$$

$$\dot{r} = \frac{M_z}{I_{ZZ}},$$

where the longitudinal force $F_x$, lateral force $F_y$ and yaw moment $M_z$ are the following, respectively:

$$F_x = F_{x1} \cos \delta_2 + F_{x2} \cos \delta_2 + F_{x3} + F_{x4} - F_{y1} \sin \delta_1 - F_{y2} \sin \delta_2$$

$$F_y = F_{y1} \cos \delta_2 + F_{y2} \cos \delta_2 + F_{y3} + F_{y4} + F_{x1} \sin \delta_1 + F_{x2} \sin \delta_2$$

$$M_z = a_1 F_{x1} \sin \delta_1 + a_1 F_{y1} \cos \delta_1 + a_1 F_{x2} \sin \delta_2 + a_1 F_{y2} \cos \delta_2 - b_{1f} F_{x1} \cos \delta_1 + b_{1f} F_{y1} \sin \delta_1 - b_{2f} F_{y2} \sin \delta_2 + b_{2f} F_{x2} \cos \delta_2 - a_2 F_{y3} - a_2 F_{y4} - b_{1r} F_{x3} + b_{2r} F_{x4}$$

The tire sideslips are for each wheel 12, respectively:

$$\alpha_1 = a\tan\left(\frac{v_y + x_1 r}{v_x - y_1 r}\right) - \delta_1$$

$$\alpha_2 = a\tan\left(\frac{v_y + x_2 r}{v_x - y_2 r}\right) - \delta_2$$

$$\alpha_3 = a\tan\left(\frac{v_y + x_3 r}{v_x - y_3 r}\right)$$

$$\alpha_4 = a\tan\left(\frac{v_y + x_4 r}{v_x - y_4 r}\right)$$

$$x_1 = x_2 = \alpha_1 \quad y_1 = b_{1f} \quad y_3 = b_{1r}$$

$$x_3 = x_4 = -\alpha_2 \quad y_2 = -b_{2f} \quad y_4 = -b_{2r}$$

The same combined slip brush tire model (or similar tire model) can be defined for each of the vehicle wheels 12, enabling the calculation of tire forces. As it reveals, the availability of the manipulation of drive torque on each side and wheel of the vehicle multiplies the number of the vehicle system's hybrid modes. Namely, two possible states (saturated or non-saturated) of the tire model on each vehicle wheels 12 results in 2*2*2*2=16 hybrid mode in case of a four-wheeled vehicle.

Besides the increased number of hybrid modes of the vehicle model, the number of controlled inputs also varies based on the vehicle's installed actuator setup. It affects the set of feasible vehicle states and the set of reachable vehicle states. With the increased number of actuators, the flexibility of motion, hence vehicle safety and speed can be increased. It is the result of two different sources:

the number of available hybrid modes and the transition capabilities between them is changing with the actuator setup, and the extent of the set of feasible (equilibrium) vehicle states increases with the more flexible actuator setup.

Based on the relation of the number of control inputs and outputs, the controlled vehicle system can be underactuated, if the number of control inputs is less than the number of outputs, fully-actuated, if the number of control inputs is equal to the number of outputs, and overactuated, if the number of control inputs is more to the number of outputs.

The fact that the provided invention defines the vehicle trajectory as a set of equilibrium states (points) of the vehicle (i.e., the set of feasible vehicle states) ensures that the vehicle can reach and settle in these equilibrium states (operating points) independently from the actuator setup, i.e., the actuator setup being an under-, a fully-, or an overactuated system.

As it is revealed from the above equations, the motion of the vehicle 10 depends on the longitudinal force, lateral force and yaw moment acting on the vehicle body ($F_x$, $F_y$, $M_z$). Detailed force and moment equations show that depending on the vehicle actuator setup, the required forces and moment for a specific motion can be realized in several ways (for example, yaw moment can be generated by turning the steering wheel or applying torque on the wheels of an axis in opposite directions). Hence, a control input allocation method is provided by the invention that could improve the performance and accuracy of the control or improve safety by providing redundancy in actuator failure.

The calculation of the set of reachable vehicle states gives information about in which hybrid mode of the vehicle is reachable in the target operation point (next point of the vehicle trajectory) reachable. In such a specific hybrid mode, which is needed for the said vehicle state transition, the effectiveness of each control input (steering, individual tire torque, etc.) on the performance outputs (lateral or longitudinal speed, yaw rate, etc.) are evaluated with measures, for example, of modal controllability and observability.

When the vehicle comprises more than one vehicle actuator, the inventive method for controlling the motion of the vehicle preferably prioritizes the use of the vehicle actuators. Prioritizing in this context means that the actuator with the highest priority or a predetermined set of actuators with the highest priorities are controlled. Such a prioritized allocation of the vehicle actuators allows for a more flexible control of the vehicle, preferably carried out by means of a measure of an effectiveness of each control input, which can be done through weighting functions applied on the control inputs. This way, the provided method preferably ensures the best utilization of the vehicle actuators to provide the best performance and an online, continuous adaptation on the basis of a failure of a vehicle actuator.

Furthermore, prioritizing of the vehicle actuators can also be implemented based a marginal efficiency (marginal benefit) of the vehicle actuators, i.e., a performance per unit actuation, similar to the concept of marginal benefit of microeconomics. The weighting function can set a usage or a usage portion of the vehicle actuators based on their marginal efficiency or effectiveness. This allows for taking a state of the vehicle actuators in into account of calculating the feasible and reachable vehicle states as well as for driving the vehicle along the trajectory. As an example, a marginal efficiency of a defected vehicle actuator is reduced, while a marginal efficiency of a completely unusable vehicle actuator is zero.

The equilibrium states of the applied vehicle model (either one-track or two-track model) can be derived by solving the above algebraic equations for the estimated conditions of the planning horizon. Calculation is performed for parameter values within the provided parameter value range, preferably for the speed and yaw rate values.

The result of the calculation is a matrix of equilibrium values, each row of the matrix representing a feasible vehicle state:

$$\begin{bmatrix} r_1 & v_{x1} & v_{y1} \\ r_2 & v_{x2} & v_{y2} \\ \vdots & \vdots & \vdots \\ r_n & v_{xn} & v_{yn} \end{bmatrix}$$

Alternatively, the set of feasible vehicle states can be defined as a manifold in the state space, e.g., as a function of the input variables.

For each feasible vehicle state, a corresponding actuator state value can also be determined, but these values are not relevant for the motion planner unit 22:

$$\begin{bmatrix} \delta_1 & F_{xF1} & F_{xR1} \\ \delta_2 & F_{xF2} & F_{xR2} \\ \vdots & \vdots & \vdots \\ \delta_n & F_{xFn} & F_{xRn} \end{bmatrix}$$

The motion control unit 20 calculates the feasible vehicle states in a requested region of a current state and setup. The future trajectory can be built as a time sequence (with the predefined timestep) of the feasible vehicle states constrained by the reachability of each feasible vehicle state at a time t.

The set of feasible vehicle states gives information about vehicle states that can be achieved considering the given vehicle and the conditions of the planning horizon, but it does not provide any information about when these feasible vehicle states can be reached in time. However, for planning a motion, not only the location and heading of the car are important, but the timing of it, too. For this reason, the set of reachable vehicle states are calculated for each of the feasible states for different timesteps, or different time horizons. It can be calculated based on the above-defined vehicle dynamics equations by applying different methods. The result will be a manifold of a set of reachable vehicle states for the given timestep. A possible method is the calculation the derivative for all the values of the actuator states in the given time horizon for a certain equilibrium state.

Figure 3:
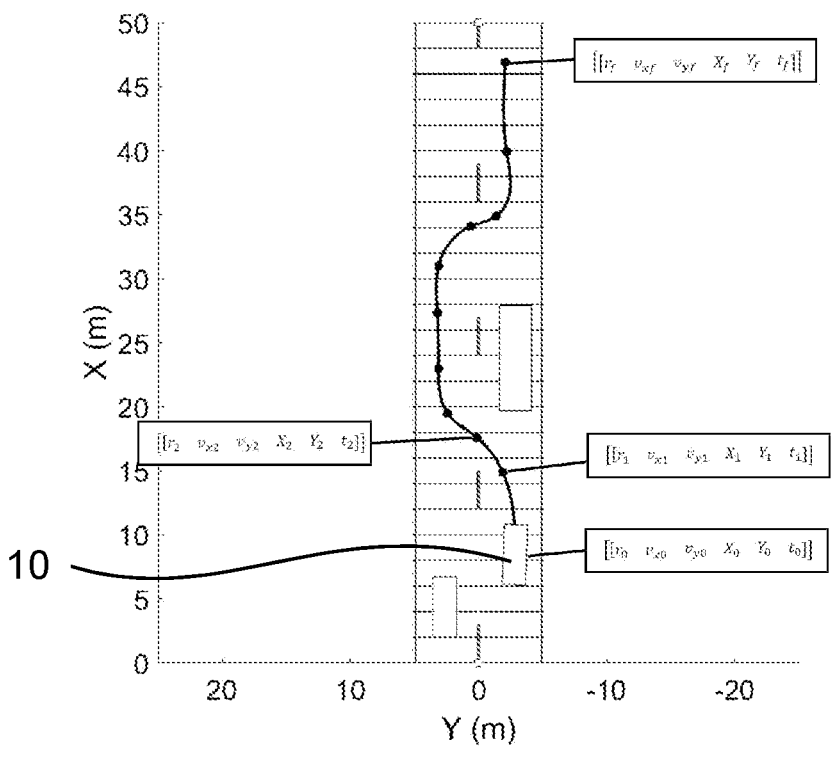
FIG. 3 is a schematic drawing of a set of feasible vehicle states constituting a vehicle trajectory during an overtaking manoeuvre.

The vehicle trajectory is constructed by the motion planner unit 22, and it is sent back to the motion control unit 20. An illustration of a vehicle trajectory for a time horizon $t_0$–$t_f$ is shown in FIG. 3. The initial position and initial state of the vehicle 10 can be measured or estimated as it was already discussed above. For the final time instance $t_f$ of the planning horizon, an aimed, final position can also be defined as follows.

Initial position and vehicle state=$X_0(t_0), Y_0(t_0), \psi_0(t_0)$

Final position and vehicle state=$X_f(t_f), Y_f(t_f), \psi_f(t_f)$

FIG. 3 shows a vehicle trajectory during an overtaking manoeuvre comprising ten feasible vehicle states including the final position and final vehicle state. As it can be seen in the figure, the motion planner unit 22 considers the position and movement of other objects, other vehicles on the road when constructing the vehicle trajectory.

Between each of the feasible vehicle states of the vehicle trajectory, a transient behaviour of the vehicle may occur depending on the setup of the control system and vehicle. The structure of the control system can be designed to follow the planned vehicle trajectory (reference trajectory) as accurately as possible. It can be designed, for example, by optimisation of the weighting filters or functions, or by applying a learning algorithm.

The vehicle states during transients can exceed the steady-state feasible values. Despite this fact, the motion control unit 20 will be able to drive the vehicle 10 into the next reference point (next feasible vehicle state of the vehicle trajectory) and keep the motion of the vehicle 10 stabilized. It could provide the possibility of a flexible and quick vehicle motion and transition of states while ensuring safety. Inherently instable vehicle dynamics can also be stabilised during the vehicle trajectory preferably by a closed loop control.

As it has already been discussed above, the motion control unit 20 simulates the vehicle trajectory to be executed. Theoretically, an infinite number of trajectories exists between two feasible setpoints. However, a perfect tracking of a calculated vehicle trajectory is not possible because all possible control techniques result in tracking error to some extent, which can result in an unintended collision. To overcome it, the provided motion control system and method preferably uses an iterative process.

The reachable set calculation provides information about in which hybrid mode is the next feasible setpoint reachable. Based on this knowledge and the control allocation method already discussed above, an initial control process is designed and applied in a closed loop on the vehicle's simulation model. After evaluating the fitness of the goal point (final position and final vehicle state), the control process can be recalculated to provide a better fit. This way, the control is iteratively tuned to provide the best fit for the goal point and state. After reaching a requested fit accuracy, the above iterative process is performed for all the transients between the requested feasible setpoints. It provides an adaptive and fine-tuned controller for each transient. Finally, the vehicle motion is simulated in closed-loop with the resulted control structure and provided for the motion planner unit 22.

Figure 4:
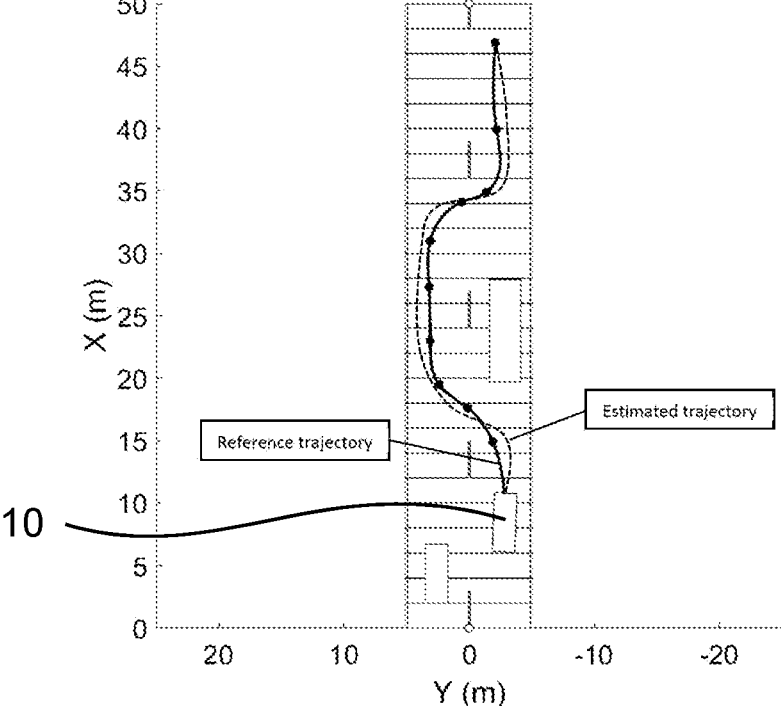
FIG. 4 is a schematic drawing of a simulated estimation of the vehicle trajectory of FIG. 3.

An example of a simulated vehicle trajectory is shown in FIG. 4 for the planned vehicle trajectory of FIG. 3. The vehicle trajectory can preferably be simulated based on the following equations:

$$X_f(t_f) = \int_{t_0}^{t_f} \sqrt{\left(v_x^2(t) + v_y^2(t)\right)} \cdot \cos\left(\beta(t) + \psi(t)\right)$$

$$Y_f(t_f) = \int_{t_0}^{t_f} \sqrt{\left(v_x^2(t) + v_y^2(t)\right)} \cdot \sin\left(\beta(t) + \psi(t)\right)$$

The real, continuous trajectory of the vehicle is simulated by the motion control unit 20, e.g., in a closed loop. The resulted expected future vehicle trajectory is sent to the motion planner unit 22 for approval. If the motion planner unit 22 accepts the proposed trajectory, the execution of the planned motion for the planning horizon can be started. Otherwise, the motion planner unit 22 can fine-tune the reference vehicle trajectory.

Figure 5:
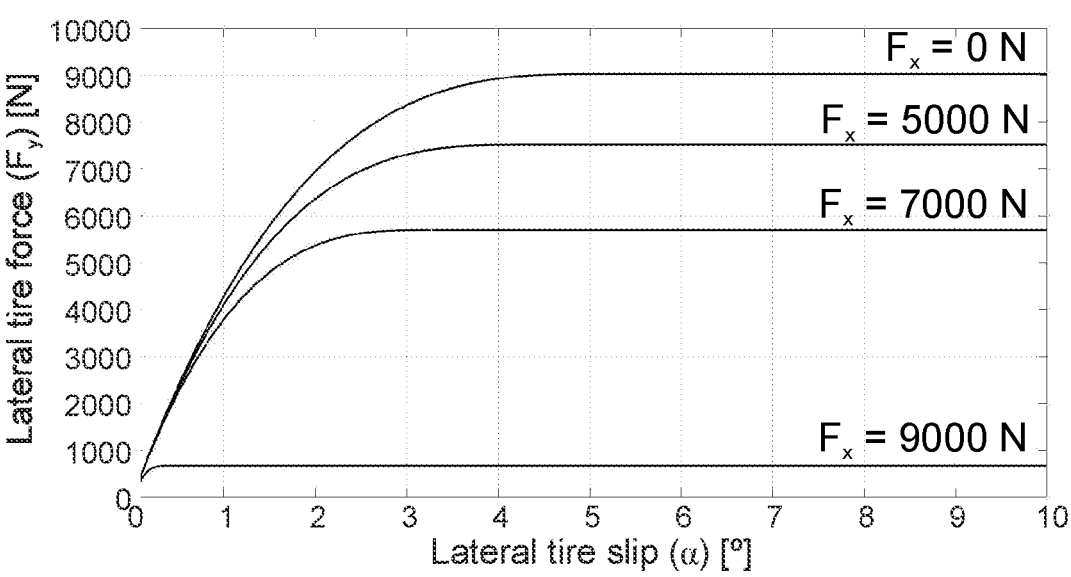
FIG. 5 is a diagram of a lateral tire force as a function of a lateral tire slip for different longitudinal tire forces.

FIG. 5 shows a diagram of a lateral tire force of an exemplary tire as a function of a lateral tire slip for different longitudinal tire forces, namely for 0 N, 5000 N, 7000 N, and 9000 N. As it can be seen each function gets saturated at a certain lateral tire slip angle, but the lateral tire slip angle where the saturation occurs is different for each longitudinal tire force. As the longitudinal tire force gets higher, the saturation occurs at a smaller lateral tire slip angle. Until reaching a plateau corresponding to the saturation, the vehicle can be controlled by turning the steering wheel, and the turning of the steering wheel will turn the vehicle in the corresponding direction. At saturation, this process stops, and the turning of the steering wheel will not affect the behaviour of the vehicle. For different tires, i.e., for tires having different characteristics, the values of exemplary lateral tire forces can be different from what is shown in FIG. 5.

Figure 6:
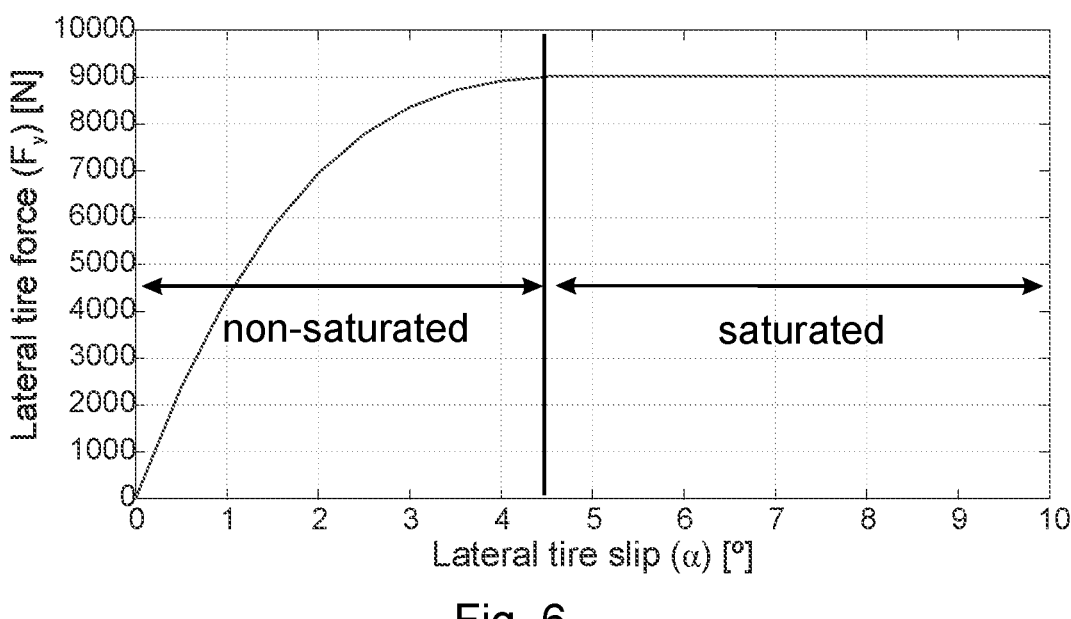
FIG. 6 is a diagram of a lateral tire force as a function of a lateral tire slip when the longitudinal tire force is zero with an indication of regions of different tire dynamics.

FIG. 6 shows a diagram of a lateral tire force as a function of a lateral tire slip when the longitudinal tire force is zero, and regions of different tire dynamics, i.e., a saturated and non-saturated region is also indicated. Based on the saturated and non-saturated regions two different hybrid modes can be defined for a given tire of the vehicle. The control method and system according to the invention is capable of switching between the different hybrid modes, i.e., the vehicle can be intentionally driven into one of the hybrid modes from another hybrid mode, for example, by driving one of the tires into a saturated state, as also shown in FIG. 7. FIG. 7 depicts vehicle states in a transition across different equilibrium points of the feasible set (feasible vehicle states). In the first 10 s, the vehicle is in the r=1 hybrid mode. After it, the vehicle enters the r=2 hybrid mode, an equilibrium state with a high sideslip with a negative sign, where the vehicle dynamics is inherently unstable. At 30 s, this negative sign changes to positive, again with an inherently unstable open-loop vehicle dynamics.

In the second subplot, the upper and lower stability limits of the yaw rate are drawn, defined as $$\pm \frac{\mu g}{V_x}.$$

As it can be seen, the actual yaw rate of the vehicle 10 exceeds the limits several time. Despite this fact, the provided motion control system and method according to the invention ensures the stability of the vehicle, and settles the vehicle 10 into feasible, stable vehicle states even utilizing the unstable region of the vehicle dynamics.

Typically, a vehicle 10 operates in hybrid mode h=1, where all the wheels 12 of the vehicle are non-saturated. In this hybrid mode, the set of feasible vehicle states are limited, which means a restricted ability of motion, which can be critical, for example, in sudden evasive manoeuvres or in motorsport applications. The access of all the four hybrid modes would provide a considerably extended set of possible motions. However, in a typical vehicle, the control authority of a human driver restricts the access to some of the hybrid modes only, as other hybrid modes and the transition into such hybrid modes may cause instability of the vehicle. A further reason for such a restriction can be that a human driver is only capable of handling a limited number of vehicle actuators at the same time. This results in a loss of many potential trajectories that could be used to evade an accident.

For example, the vast majority of the commercially available passenger cars are tuned to understeer. Due to this fact, the hybrid modes h=2 and h=4 are not available for the driver. The provided motion control system ensures any arbitrary transition between the four (or sixteen) hybrid modes (although the available actuator setup can be limiting). Hence, extending the set of feasible vehicle states ensures maximal vehicle manoeuvrability in the framework of actual physical limits.

FIGS. 8 to 14 illustrate sets of feasible vehicle states for different hybrid modes and conditions based on the one-track model of a vehicle. Each of the calculated feasible vehicle state corresponds to a point, denoted by a cross or a circle, in the plane of the body sideslip and the yaw rate.

Figure 8:
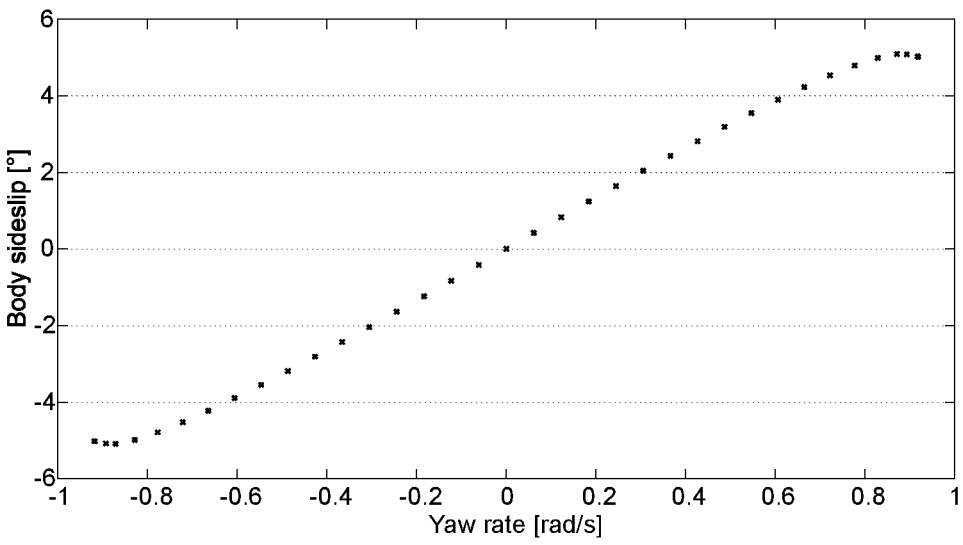
FIG. 8 is a diagram showing a set of feasible vehicle states when all the tires are non-saturated (hybrid mode 1)

The feasible vehicle states illustrated in FIG. 8 correspond to a typical operation of a vehicle 10, wherein all tires (both tires) of the vehicle 10 are non-saturated, thus the vehicle 10 is in hybrid mode h=1. The feasible vehicle states were calculated for a longitudinal speed of $v_x$=10 m/s, wherein the steering angle $\delta$ was varied between −16.5° and 16.5° in 0.5° increments, and the front traction force $F_{xF}$, i.e., the traction force on the front tire(s), was zero. As it is expected, by the turn of a steering wheel, the body sideslip and the yaw rate also change, and the change is almost linear.

Figures 9, 10:
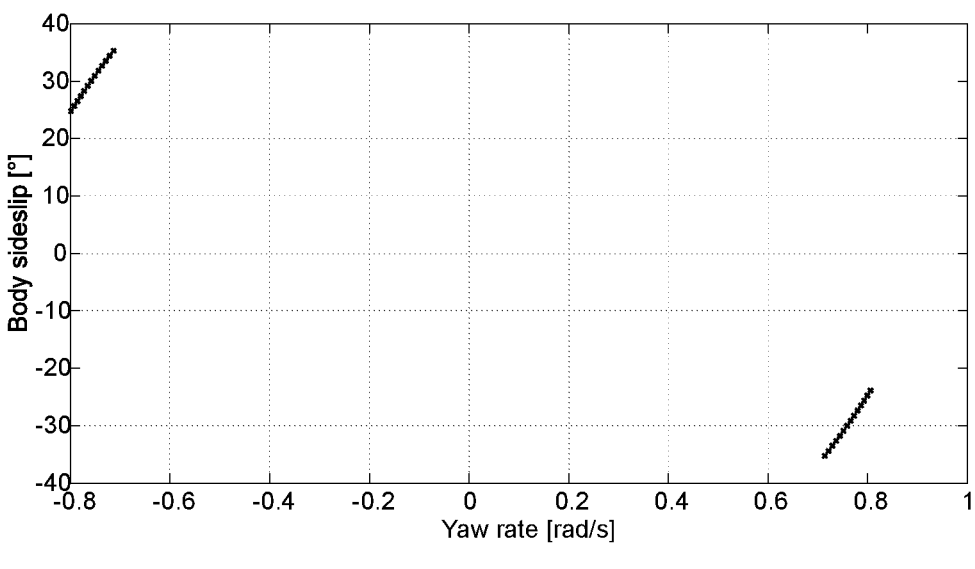
FIG. 9 and FIG. 10 are diagrams showing a set of feasible vehicle states when the front tires are non-saturated and the rear tires are saturated (hybrid mode 2)

FIG. 9 and FIG. 10 illustrate a set of feasible vehicle states each, when the front tires are non-saturated and the rear tires are saturated, so the vehicle 10 is in hybrid mode h=2. FIG. 9 shows feasible vehicle states that correspond to front traction force $F_{xF}$=0 and longitudinal speed $v_x$=10 m/s, wherein the steering angle $\delta$ is swept from −30° to −17° and from 17° to 30° in 0.5° increments. Negative steering angles correspond to feasible vehicle states having a positive yaw rate, and positive steering angles correspond to feasible vehicle states having a negative yaw rate.

FIG. 10 shows feasible vehicle states, wherein the steering angle $\delta$ was kept constant at 20°, the longitudinal speed was $v_x$=10 m/s, and front traction force $F_{xF}$ was swept from −5000 N to 1000 N in 1000 N increments. As it can be seen from FIG. 10, the yaw rate decreases with decreasing front traction forces.

Figure 11:
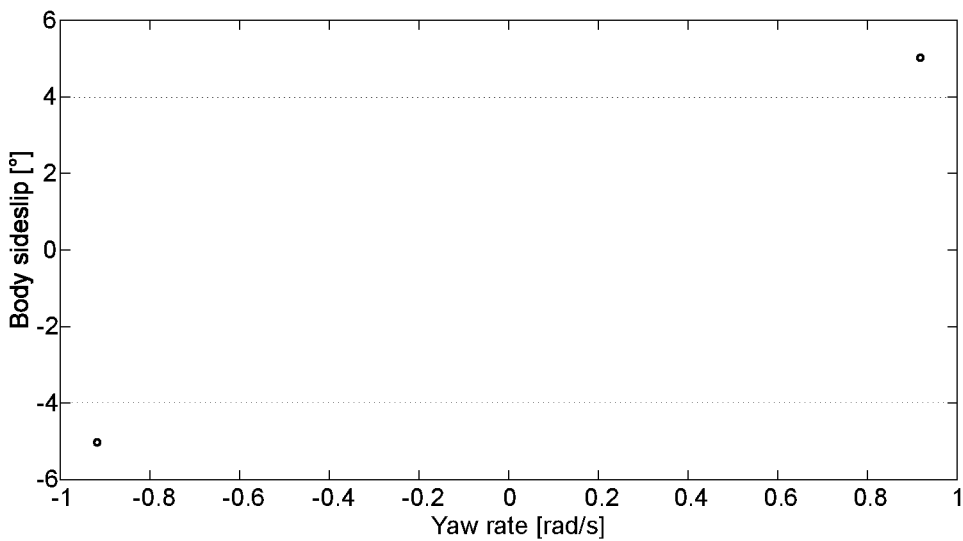
FIG. 11 and FIG. 12 are diagrams showing a set of feasible vehicle states when the front tires are saturated and the rear tires are non-saturated (hybrid mode 3)
Figure 12:
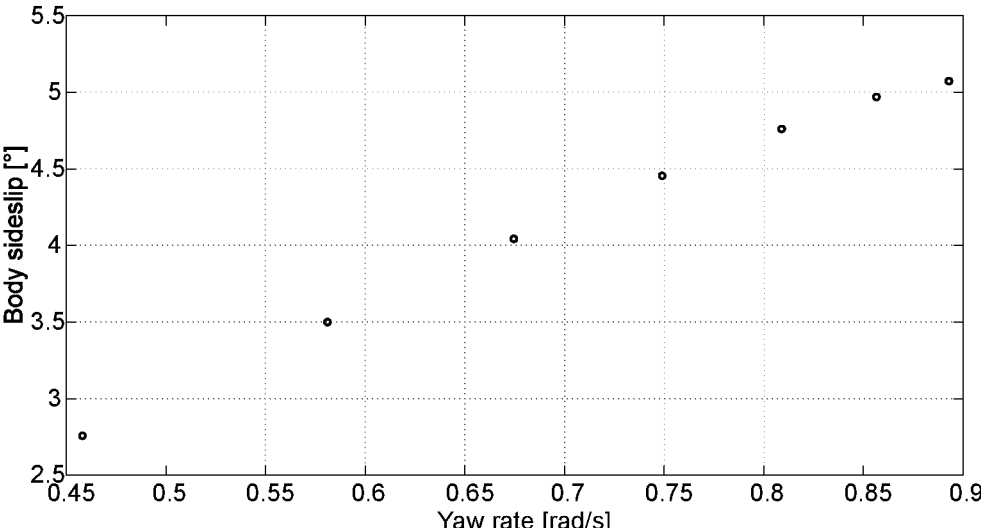

FIG. 11 and FIG. 12 illustrate a set of feasible vehicle states when the front tires are saturated and the rear tires are non-saturated, which corresponds to hybrid mode h=3.

FIG. 11 shows feasible vehicle states, wherein the steering angle $\delta$ was changed from −30° to −17° and from 17° to 30°, while the longitudinal speed $v_x$ was fixed to 10 m/s. In this scenario, each feasible vehicle state has the same body sideslip and yaw rate, however the front traction force $F_{xF}$ and the rear traction force $F_{xR}$ may be different.

FIG. 12 shows equilibrium points (feasible vehicle states) with changing rear traction force $F_{xR}$ and a fixed steering angle ($\delta$=20°). The rear traction force $F_{xR}$ was sweeping from 1000 N to 7000 N in 1000 N increments. On the front wheel 12a a corresponding braking force occurs. Although the steering angle $\delta$ was kept constant, the yaw rate is changing, hence the curvature radius is changing.

Figure 13:
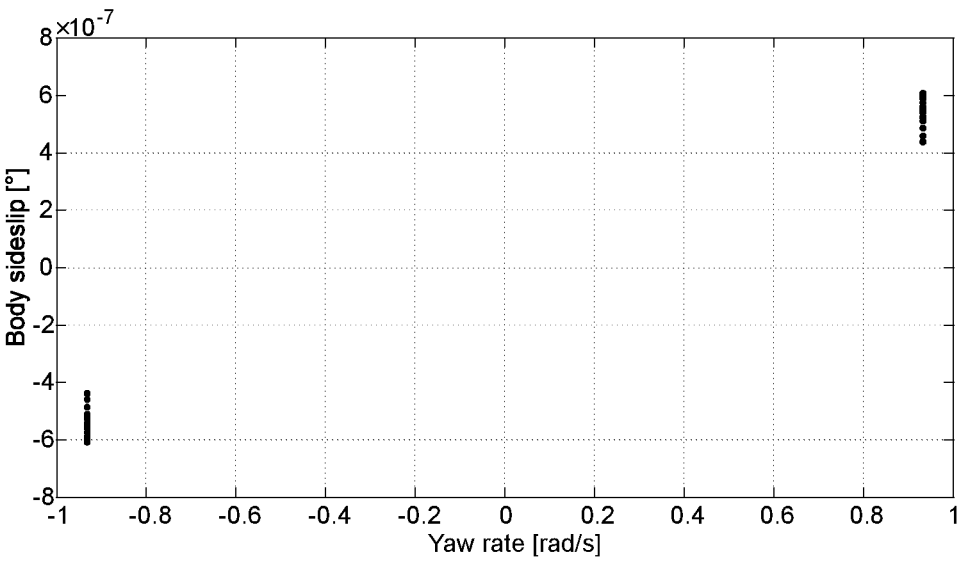
FIG. 13 and FIG. 14 are diagrams showing a set of feasible vehicle states when all tires are saturated (hybrid mode 4).
Figure 14:
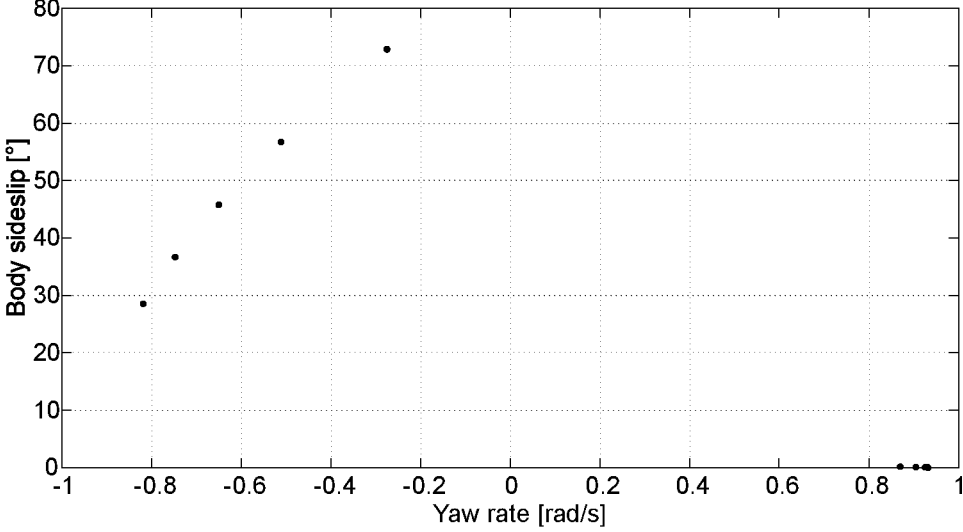

FIG. 13 and FIG. 14 illustrate a set of feasible vehicle states when all wheels 12 are saturated (hybrid mode h=4).

In FIG. 13, the rear traction force was kept constant ($F_{xR}$=0 N), and the steering angle $\delta$ was changed from −12° to −30° and from 12° to 30° in 1° increments. In this hybrid mode, without rear traction, the vehicle reaches the theoretical maximum of the steady-state yaw-rate being

23

24

$$\frac{\mu g}{v_x},$$

independently from the steering angle δ. Positive steering angles correspond to positive yaw rates in the figure.

FIG. 14 shows feasible vehicle states calculated for a fixed steering angle δ=20°), while the rear traction force $F_{xR}$ was sweeping from 0 N to 8000 N in 1000 N increments. Feasible vehicle states corresponding to 0-3000 N can be seen on the right side of the figure (almost zero body sideslip), from 4000 N, the equilibrium point appear at negative yaw rate values. Increasing sideslip corresponds to increasing traction forces. The front traction force first decreases corresponding to rear traction forces from 0 N to 3000 N, then it increases again.

The invention is, of course, not limited to the preferred embodiments described in detail above, but further variants, modifications and developments are possible within the scope of protection determined by the claims. Furthermore, all embodiments that can be defined by any arbitrary dependent claim combination belong to the invention.

LIST OF REFERENCE SIGNS

10 vehicle
12 wheel
12*a* front wheel
12*b* rear wheel
14 propulsion system
16 steering system
18 sensor system
20 motion control unit
22 motion planner unit

The invention claimed is:

1. A method for autonomous motion control and motion planning of a vehicle having wheels, the method comprising the steps of providing an initial vehicle position, an initial time instance and an initial vehicle state characterized by at least one vehicle state parameter, providing a parameter value range for the vehicle state parameter, and a step-parameter having a step-value, calculating, by a motion control unit (20), a set of feasible vehicle states comprising feasible vehicle states for parameter values within the parameter value range, wherein the feasible vehicle states are equilibrium states of the vehicle state parameter, determining, by the motion control unit (20), a set of reachable vehicle states, wherein each of the reachable vehicle states is a feasible vehicle state that can be reached within the step-value of the step-parameter from a same feasible vehicle state or from another feasible vehicle state, constructing a vehicle trajectory, by a motion planner unit (22), the vehicle trajectory being a sequence of consecutive feasible vehicle states starting from the initial vehicle state and the initial vehicle position and comprising for each consecutive feasible vehicle state of the vehicle trajectory a vehicle position and a time instance, wherein the consecutive feasible vehicle states of the vehicle trajectory are reachable vehicle states on the basis of a previous feasible vehicle state, of a vehicle position belonging to the previous feasible vehicle state, of a previous time instance of the previous feasible vehicle state, and of the step-value of the step-parameter, and controlling, by the motion control unit (20), at least one vehicle actuator to drive the vehicle to each of the consecutive feasible vehicle states of the vehicle trajectory, characterized in that the vehicle is defined as a hybrid dynamical system having hybrid modes, the hybrid modes altogether describing continuous dynamic behaviours and discrete dynamic behaviours of the vehicle, wherein the hybrid modes include two hybrid modes for each wheel, one hybrid mode in which said wheel is in tire-road interaction saturation and another hybrid mode in which said wheel is not in tire-road interaction saturation, the hybrid modes are defined based on hybrid mode parameters, wherein the hybrid mode parameters include tire-road interaction saturation states of the wheels, the feasible vehicle states are calculated for each hybrid mode, and each feasible vehicle state of the vehicle trajectory corresponds to a same hybrid mode or to a different hybrid mode compared to the hybrid mode of the previous feasible vehicle state of the vehicle trajectory.

2. The method according to claim 1, characterized in that the hybrid mode parameters further include an availability of the at least one vehicle actuator, a failure mode of the at least one vehicle actuator, an availability of a sensor, or a failure mode of a sensor.

3. The method according to claim 2, characterized in that the sensor is a steering angle sensor, a torque sensor, a wheel speed sensor, an odometry sensor, a camera, a radar and/or a lidar.

4. The method according to claim 1, characterized in that transitions between the consecutive feasible vehicle states are controlled by the motion control unit (20) via a position based control, a time based control or a space-time based control.

5. The method according to claim 1, characterized in that the vehicle state parameter is a yaw rate, a longitudinal velocity or a lateral velocity of the vehicle.

6. The method according to claim 1, characterized in that the step-parameter is a temporal parameter and/or a spatial parameter, and the step-value of the step-parameter is a timestep and/or a distance.

7. The method according to claim 1, characterized in that the set of consecutive feasible vehicle states is calculated for a discrete set of parameter values within the parameter value range.

8. The method according to claim 7, characterized in that the discrete set of parameter values comprises uniformly distributed parameter values within the parameter value range.

9. The method according to claim 1, characterized in that the set of feasible vehicle states is a continuous set calculated for a continuous interval of parameter values within the parameter value range.

10. The method according to claim 1, characterized in that the calculation of the set of feasible vehicle states is based on a first set of parameters comprising at least one of the following: vehicle parameters, capabilities of the at least one actuator and environmental conditions.

11. The method according to claim 1, characterized in that the parameter value range and the step-value of the step-parameter are provided by the motion planner unit (22).

12. The method according to claim 11, characterized in that the parameter value range and the step-value of the step-parameter are determined based on a second set of parameters comprising at least one of the following: a parameter of a map, a parameter of a free space around the vehicle, a parameter of a moving obstacle around the vehicle, a parameter of a stationary obstacle around the vehicle.

13. The method according to claim 1, characterized in that the initial vehicle state is determined on the basis of a signal of a sensor and/or of a status of the at least one vehicle actuator.

14. The method according to claim 1, characterized in that the at least one vehicle actuator is a steering system (16), a drive system, a brake system and/or a wheel suspension system.

15. The method according to claim 1, characterized in that more than one vehicle actuators are applied, wherein an allocation of the vehicle actuators is prioritized by the motion control unit (20), and the actuator with the highest priority or a predetermined set of actuators with the highest priorities are controlled by the motion control unit (20) to drive the vehicle to each of the consecutive feasible vehicle states of the vehicle trajectory.

16. The method according to claim 15, characterized in that the motion control unit (20) prioritizes the allocation of the vehicle actuators by means of weighting functions, wherein the weighting functions are preferably based on a marginal efficiency of the vehicle actuators or on an effectiveness of the vehicle actuators.

17. The method according to claim 1, characterized by further comprising the steps of simulating, by the motion control unit (20), the vehicle trajectory, transmitting the simulated vehicle trajectory to the motion planner unit (22) for evaluation, and approving or rejecting the vehicle trajectory by the motion planner unit (22), wherein upon approval of the vehicle trajectory a request is sent to the motion control unit (20) to drive the vehicle (10) according to the vehicle trajectory, and upon rejection of the vehicle trajectory a new vehicle trajectory is constructed by the motion planner unit (22).

18. A system for autonomous motion control of a vehicle (10) having wheels, comprising at least one vehicle actuator, a motion control unit (20) connected to the at least one vehicle actuator, wherein the motion control unit (20) is configured to receive a parameter value range for a vehicle state parameter and a step-value of a step-parameter, calculate a set of feasible vehicle states comprising feasible vehicle states for parameter values within the parameter value range, wherein the feasible vehicle states are equilibrium states of the vehicle state parameter, calculate a set of reachable vehicle states, wherein each of the reachable vehicle states is a feasible vehicle state that can be reached from a same feasible vehicle state or from another feasible vehicle state within the step-value of the step-parameter, and control at least one vehicle actuator to drive the vehicle (10) according to a vehicle trajectory, wherein the vehicle trajectory is a sequence of consecutive feasible vehicle states starting from an initial vehicle state and an initial vehicle position and comprising for each consecutive feasible vehicle state of the vehicle trajectory a vehicle position and a time instance, wherein the consecutive feasible vehicle states of the vehicle trajectory are reachable vehicle states on the basis of a previous feasible vehicle state, of a vehicle position belonging to the previous feasible vehicle state, of a previous time instance of the previous feasible vehicle state, and of the step-value of the step-parameter, and a motion planner unit (22) connected to the motion control unit (20), wherein the motion planner unit (22) is configured to construct the vehicle trajectory, characterized in that the vehicle is defined as a hybrid dynamical system having hybrid modes, the hybrid modes altogether describing continuous dynamic behaviours and discrete dynamic behaviours of the vehicle, wherein the hybrid modes include two hybrid modes for each wheel, one hybrid mode in which said wheel is in tire-road interaction saturation and another hybrid mode in which said wheel is not in tire-road interaction saturation, the hybrid modes are defined based on one or more hybrid mode parameters, wherein the hybrid mode parameters include tire-road interaction saturation states of the wheels the feasible vehicle states are calculated for each hybrid mode, and consecutive feasible states of the vehicle trajectory belong to a same or a different hybrid mode.

19. The system according to claim 18, characterized in that the hybrid mode parameters further include an availability of the at least one vehicle actuator, a failure mode of the at least one vehicle actuator, an availability of a sensor, or a failure mode of a sensor.

20. The system according to claim 18, characterized in that the vehicle actuator is a steering system (16), a drive system, a brake system, and/or a wheel suspension system.

21. The system according to claim 18, characterized in that it further comprises a sensor system (18) connected to the motion control unit (20), wherein the sensor system (18) is adapted to provide the motion control unit (20) with an initial vehicle position and an initial vehicle state.

22. The system according to claim 21, characterized in that the sensor system (18) is further adapted to provide the motion control unit (20) with a first set of parameters for calculating the set of feasible vehicle states, wherein the first set of parameters comprises at least one of the following: vehicle parameters, actuator capabilities and environmental conditions.

23. The system according to claim 21, characterized in that the sensor system (18) comprises at least one sensor, wherein the sensor is a steering angle sensor, a torque sensor, a wheel speed sensor, an odometry sensor, a camera, a radar or a lidar.

\* \* \* \* \*